US012693916B2

(12) United States Patent
Jones et al.

(10) Patent No.: US 12,693,916 B2
(45) Date of Patent: Jul. 28, 2026

(54) REDUCING START LATENCY OF SERVERLESS MICROSERVICES

(71) Applicant: International Business Machines Corporation, Armonk, NY (US)

(72) Inventors: David Richard Jones, Eastleigh (GB); Ian Partridge, Eastleigh (GB); Christopher Neil Bailey, Romsey (GB); Sandra Hayward, Eastleigh (GB); Johanna Saladas Zaaijer, Winchester (GB); Matthew Paul Wilson, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 17/172,407

(22) Filed: Feb. 10, 2021

(65) Prior Publication Data

US 2022/0253347 A1      Aug. 11, 2022

(51) Int. Cl.
*G06F 9/54*          (2006.01)
*G06F 9/4401*          (2018.01)

(52) U.S. Cl.
CPC ............ *G06F 9/547* (2013.01); *G06F 9/4418* (2013.01); *G06F 9/542* (2013.01); *G06F 9/546* (2013.01)

(58) Field of Classification Search
CPC ........ G06F 9/547; G06F 9/4418; G06F 9/542; G06F 9/546
See application file for complete search history.

(56) References Cited

U.S. PATENT DOCUMENTS 10,547,522 B2    1/2020  Hutchison
2014/0046638 A1*   2/2014  Peloski ............... G06F 16/2246
                                                              703/6

(Continued)

FOREIGN PATENT DOCUMENTS

CN          111597048 A  *   8/2020
WO      2022/171127 A1    8/2022

OTHER PUBLICATIONS

Pawel Zuk, Krzysztof Rzadca; Scheduling Methods to Reduce Response Latency of Function as a Service; Sep. 9-11, 2020; 9 pages (Year: 2020).*

(Continued)

*Primary Examiner* — Kevin L Young
*Assistant Examiner* — Kimberly L Jordan
(74) *Attorney, Agent, or Firm* — Seed Intellectual Property Law Group LLP

(57)          ABSTRACT

A process or may reduce start latency of serverless microservices. The processor may detect an incoming request or event to an application in a serverless microservice environment. The incoming request or event may initiate a chain of invocations of one or more microservices of the application. The processor may select an amount of selected microservices from the one or more microservices of the application. The amount of selected microservices may perform a task of the incoming request or event. The task may apply one or more predefined application-specific rules to one or more elements of the incoming request or event to determine the amount of selected microservices. The processor may trigger scaling up activation of the one or more microservices of the application. The processor may invoke the one or more microservices of the application to match the amount of selected microservices.

20 Claims, 8 Drawing Sheets

100

(56) References Cited

U.S. PATENT DOCUMENTS

| | | | | |
|---|---|---|---|---|
| 2019/0108067 | A1* | 4/2019 | Ishikawa | G06F 8/76 |
| 2019/0205186 | A1* | 7/2019 | Zhang | G06F 9/4843 |
| 2019/0312800 | A1* | 10/2019 | Schibler | G06F 8/65 |
| 2020/0052982 | A1 | 2/2020 | Nainar | |
| 2020/0081745 | A1 | 3/2020 | Cybulski | |
| 2020/0133731 | A1* | 4/2020 | Barbara | G06F 9/5011 |
| 2020/0364098 | A1 | 11/2020 | Yan | |
| 2021/0042160 | A1* | 2/2021 | Alamouti | H04L 67/565 |
| 2021/0208941 | A1* | 7/2021 | Fong | G06F 9/45558 |
| 2021/0288885 | A1* | 9/2021 | Malleni | G06F 9/45533 |
| 2023/0088581 | A1* | 3/2023 | Wilson | H04L 67/63 |
| | | | | 709/226 |

OTHER PUBLICATIONS

Delyan Raychev; Application Gateway Ingress Controller for Azure Kubernetes Service; https://azure.microsoft.com/en-us/blog/application-gateway-ingress-controller-for-azure-kubernetes-service/; Dec. 2, 2019; 7 pages (Year: 2019).*

Stéphane Maarek; How to use Apache Kafka to transform a batch pipeline into a real-time one; https://medium.com/@stephane.maarek/how-to-use-apache-kafka-to-transform-a-batch-pipeline-into-a-real-time-one-831b48a6ad85; Oct. 24, 2017; 37 pages (Year: 2017).*

Anonymous. "Horizontal Pod Autoscaler." Accessed Dec. 23, 2020. 9 pages. Published by Kubernetes. https://kubernetes.io/docs/tasks/run-application/horizontal-pod-autoscale/.

Ellis, A., "Scale to Zero and Back Again with OpenFaaS." Published Jul. 25, 2018. 8 pages. Published by OpenFAAS. https://www.openfaas.com/blog/zero-scale/.

Lin, et al., "Mitigating Cold Starts in Serverless Platforms—A Pool-Based Approach." Published Mar. 28, 2019. 5 pages. Published by ARXIV. https://arxiv.org/pdf/1903.12221.pdf.

Mell, et al., "The NIST Definition of Cloud Computing," Recommendations of the National Institute of Standards and Technology, U.S. Department of Commerce, Special Publication 800-145, Sep. 2011, 7 pgs.

Ross, et al., "OpenShift Service Idler." Published Jul. 5, 2018. 4 pages. Published by Github. https://github.com/openshift/service-idler.

Xu, et al., "Adaptive Function Launching Acceleration in Serverless Computing Platforms." Published in 2019. 8 pages. 2019 IEEE 25th International Conference on Parallel and Distributed Systems (ICPADS), pp. 9-16. Tianjin, China. https://ieeexplore.ieee.org/document/8975850.

International Search Report and Written Opinion, International Application No. PCT/CN2022/075667, Mailed May 7, 2022, 10 pages.

Jones, et al., "Reducing Start Latency of Serverless Micros", International Application No. PCT/CN2022/075667, International Filing Date Feb. 9, 2022, 48 pages.

"Autoscaling function deployment in Kubeless", Autoscaling.md, retrieved from web https://www.google.com/search?q=kubeless+autoscale+qps+replicas, dated Feb. 20, 2025, 3 pages.

* cited by examiner

100

350

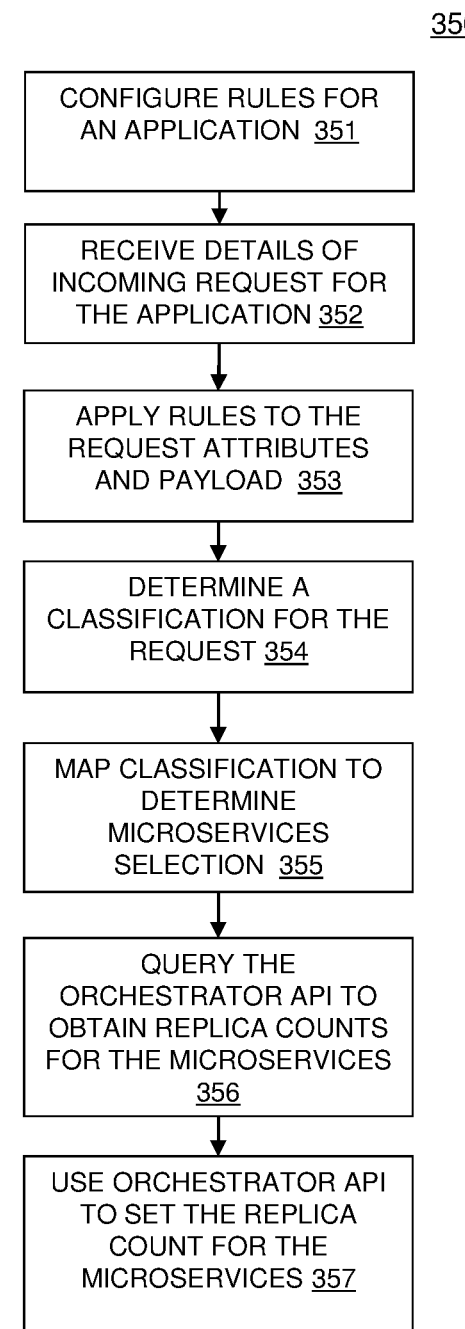

CONFIGURE RULES FOR AN APPLICATION 351

↓

RECEIVE DETAILS OF INCOMING REQUEST FOR THE APPLICATION 352

↓

APPLY RULES TO THE REQUEST ATTRIBUTES AND PAYLOAD 353

↓

DETERMINE A CLASSIFICATION FOR THE REQUEST 354

↓

MAP CLASSIFICATION TO DETERMINE MICROSERVICES SELECTION 355

↓

QUERY THE ORCHESTRATOR API TO OBTAIN REPLICA COUNTS FOR THE MICROSERVICES 356

↓

USE ORCHESTRATOR API TO SET THE REPLICA COUNT FOR THE MICROSERVICES 357

REDUCING START LATENCY OF SERVERLESS MICROSERVICES

BACKGROUND

The present invention relates to microservice computing systems, and more specifically, to a microservice activation method for reducing start latency of serverless microservices.

It is common practice to decompose complex applications into many independent parts (referred to as "microservices"), that cooperate via messaging, and the combined set of microservices represents a complete application.

Containers are used for deploying microservices of applications in the cloud. Containers offer significant advantages over previous technologies like Virtual Machines as they are more portable, quicker to start and stop, and integrate better with continuous integration and continuous deliver (CI/CD) systems. Multiple containers can be run or "orchestrated" together, where each container runs a separate microservice and the combined set of microservices represents a complete application. For example, Kubernetes (Kubernetes is a trademark of The Linux Foundation) is an open-source container orchestration system for automating application deployment, scaling, and management.

SUMMARY

Embodiments of the present disclosure include a method, system, and computer program product for reducing start latency of serverless microservices. The processor may detect an incoming request or event to an application in a serverless microservice environment. The incoming request or event may initiate a chain of invocations of one or more microservices of the application. The processor may select an amount of selected microservices from the one or more microservices of the application. The amount of selected microservices may perform a task of the incoming request or event. The task may apply one or more predefined application-specific rules to one or more elements of the incoming request or event to determine the amount of selected microservices. The processor may trigger scaling up activation of the one or more microservices of the application. The processor may invoke the one or more microservices of the application to match the amount of selected microservices.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 3B illustrates a flowchart diagram of an example method, in accordance with embodiments of the present disclosure.

Figure 1:
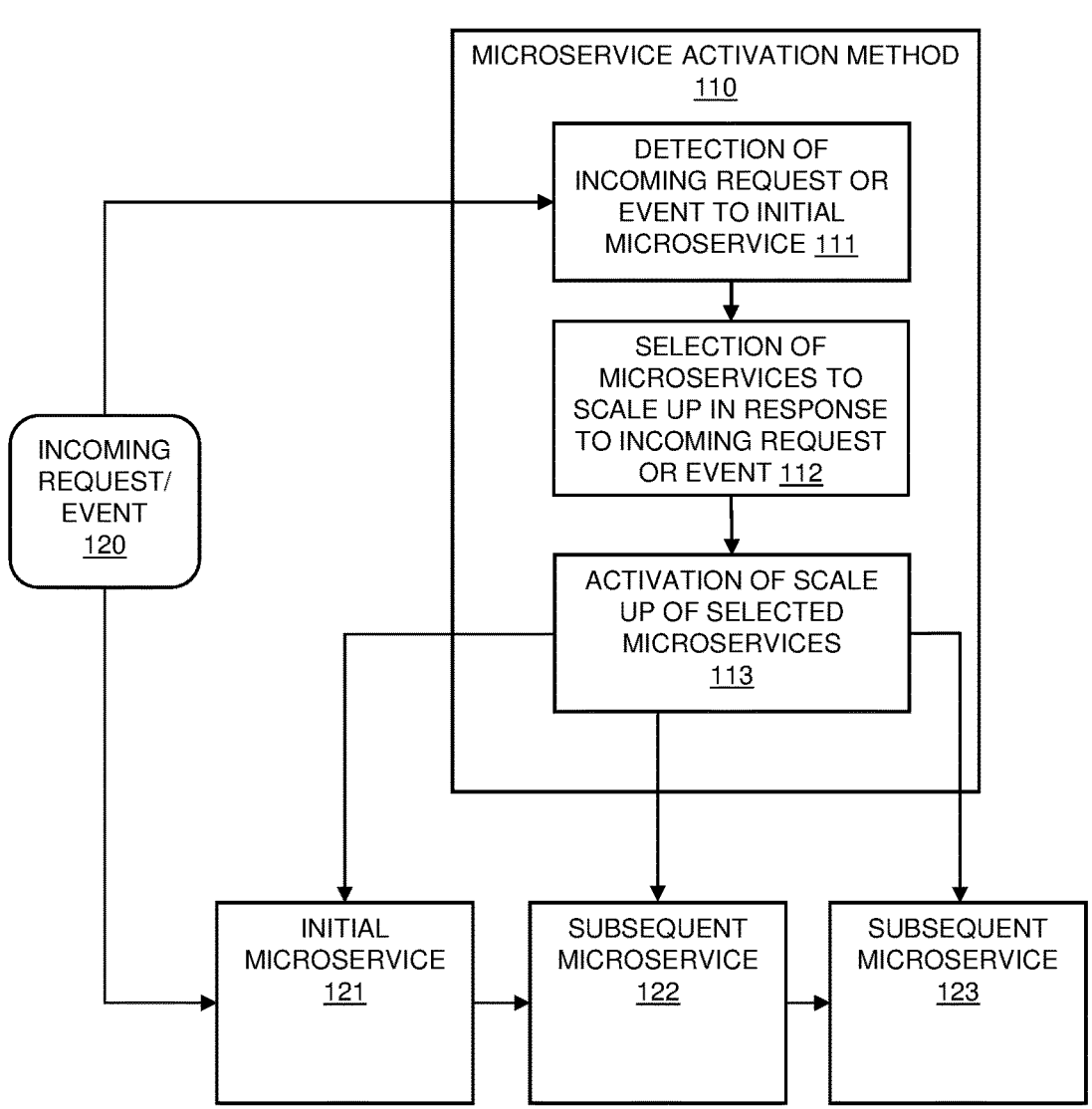
FIG. 1 illustrates a flowchart diagram of a method, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

A system and a method are provided for reducing start latency of serverless microservices by reducing cold-start time. Embodiments described herein may reduce cold-start time by proactively scaling microservices. Such scaling of microservices, may be based on the detection of an incoming request or event.

Cloud environments typically bill users according the resources consumed and, despite containers being less resource hungry, the cost of such "compute" capacity can still be substantial if left unchecked. Often, idle containers continue to consume resources despite being idle. Such consumption of resources during an idle state can result, not only in resource waste but an unnecessary increase in cost. As such, methods and techniques associated with minimizing the time containers run unnecessarily, particularly during idle states, is desired.

The practice of running containers on demand, and in particular "scaling to zero" when idle, is known as "serverless". A variety of open-source projects offer serverless technologies, for example, the Knative Serving® project (Knative is a trademark of Google LLC), which provides "scale to zero" for workloads running on the Kubernetes container orchestration system. Scaling to zero involves allowing a scaling service to terminate all instances of a service when there are no requests for the service to process. It is accompanied by a corresponding ability to scale the service up to one or more instances once such a request arrives.

The advantage of serverless is evident as containers are only scaled up and resources only consumed when there is work in the system. However, serverless comes with a cost as it takes time to start a container and the application within it. The time taken between a request coming in and the serverless application being available, also known as the "cold-start" problem, can result in a significant time delay.

This problem is exacerbated in a system of microservices where a single incoming request or event may require the invocation of multiple microservices before the response can be returned to the user. If each microservice in the system is serverless and has to scale from zero, the cumulative cold-start time of each microservice may cause large response latencies. In the worst case, the latency would be the sum of the cold-start time of each microservice. Hence, there is a need to minimize cold-start latency for serverless microservices.

Embodiments disclosed herein minimize/reduce cold-start latency for serverless microservices. Incoming requests or events to a microservice system are typically routed via an ingress controller such as a boundary firewall, application programming interface (API) gateway, or other form of ingress controller that validates the incoming request or event and routes it to an initial microservice inside the orchestration system. After such processes, handling of the request or event occurs inside the microservice system until a response is returned from the initial microservice.

A single incoming request or event may require the invocation of multiple microservices before the response can be returned to the user. Microservice based applications are not typically designed so that each microservice is invoked separately by the client. Instead, the microservices generally invoke each other as needed, forming a cooperative system. This causes a chain of microservices that may be invoked from a single incoming request.

In embodiments, after validating the incoming request or event, a set of required microservices in the system may be proactively scaled from zero simultaneously. In these embodiments, by beginning the cold start proactively may increase the likelihood that each microservice is ready/available by the time it receives a call (e.g., when the microservice is needed) or, in situations where the microservice is not yet readily available, reduces the cold-start time. In these embodiments, often cold-start time is reduced because scaling may already be underway when a request or event is received.

Embodiments of methods and systems described herein, may scale all the microservices involved in a single request or event. In addition to reducing cold-start time, embodiments described herein may also reduce resource waste by scaling the microservice containers to zero and starting the microservice containers up when it is determined that they are needed for an incoming request can result in reducing resource waste.

Referring to FIG. 1, a flowchart illustrating an example method 100 is depicted, in accordance with embodiments of the present disclosure. An incoming request or event 120 may be directed to an application. Such an application may be provided by multiple microservices. The described microservice activation embodiments contemplated herein, may be broadly applicable to various microservice deployments. In some embodiments, microservice deployments may communicate by hypertext transfer protocol HTTP/representational state transfer (REST) or events.

In embodiments, incoming request or event 120 may be directed to an initial microservice 121. In these embodiments, initial microservice 121 may invoke subsequent microservices 122, 123. In some embodiments microservices 122, 123 may be required for the fulfillment of a response to the request or event 120.

In embodiments, microservice activation method 110 may detects 111 an incoming request or event 120 to an initial microservice 121. In these embodiments, microservice activation method 110 may select 112 a set of microservices. Such a set of microservices may be required for the fulfillment of the incoming request or event 120 and therefore need to be scaled up.

In embodiments, selection 112 may be based on a set of defined rules that can determine a set of the microservices of an application that could be required for the incoming request or event. In some embodiments, a static rule set is defined and applied to selectively and proactively scale only the components of the application that are predicted to be required (e.g., those required to process the incoming request). The application of the rules may be based on elements of the request or event. For example, in embodiments where the request or event is an HTTP request, the elements may include the request payload and request metadata or may also include, the elements obtained by parsing the event structure or schema.

In some embodiments, not all microservices may be involved in every transaction. As such, selecting only the microservices involved in fulfilling the incoming request may conserve resources. For example, an application may include a user profile, order processing, and billing components, and a user's incoming request to update their profile may not involve the order processing or billing components. As a result, microservices associated with the user's request to update their profile would be selected, while the microservices associated with order processing or billing components would not be selected.

In embodiments, microservice activation method 110 may activate 113 a scaling up of the selected microservices 122, 123. This activation may allow selected microservices 122, 123 to be ready and/or getting ready, to be invoked by either the initial microservice 121 and/or an intermediate microservice. This invocation can allow for the fulfillment of the incoming request or event 120.

In embodiments, by applying rules to select a subset of the microservices of an application, may ensure only microservices that are likely to be used in processing the specific incoming request or event are scaled, rather than scaling the entire application. This avoids consuming resources, and the associated costs incurred, by needlessly scaling components that will not be used in the current request or event. The embodiments associated with the method and system, as contemplated herein, can be applicable to applications with arbitrary sequences of calls between the individual microservices. By predicting which microservices may be called, can allow for a more dynamic response to an event or request that can ensure containers, that are unlikely to be used, that will not be used or activated in response to the event or request. Minimizing the number of microservices activated/used to only those required to be used can result in a reduction of resource usage and minimize the corresponding costs. In these embodiments, the latency associated with a cold start can be reduced to the time taken by the startup time of the slowest microservice involved, rather than the cumulative startup time where each service scales as it is invoked. The microservice activation method may be carried out at various possible stages of a microservices system.

Figure 2:
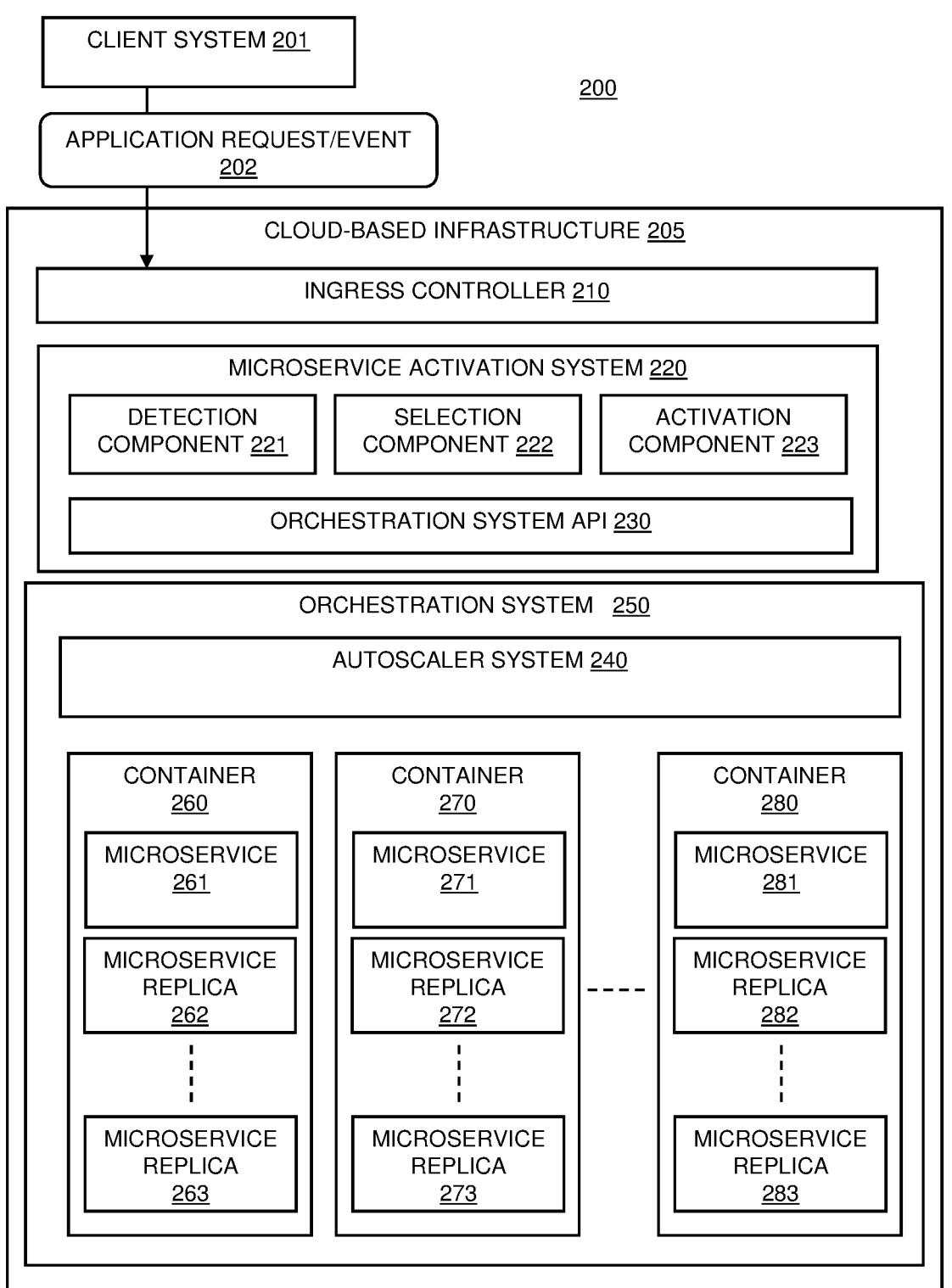
FIG. 2 depicts a block diagram of an example embodiment of a system, in accordance with embodiments of the present disclosure.

Referring to FIG. 2, a block diagram 200 shows a system that may be provided by multiple computing systems across a cloud-based computing infrastructure 205 providing a cloud-based application using microservices 261, 271, 281. The cloud-based computing infrastructure 205 may include multiple computing systems that each include at least one processor, a hardware module, or a circuit for executing the functions of components which may be software units executing on the at least one processor. Each computing system may include multiple processors running parallel processing threads may be provided enabling parallel processing of some or all of the functions of the components. Memory may be configured to provide computer instructions to the at least one processor to carry out the functionality of the components.

A client system 201 may interact with the cloud-based application by making application requests or events 202 and the application will typically perform work in response to the request or event. An ingress controller 210 may receive the request or event 202 and may determine the microservice 261, 271, 281 that should receive it.

An orchestration system 250 is provided for automating application deployment across microservices. Containers 260, 270, 280 are provided that are orchestrated together with each container 260, 270, 280 running a separate microservice 261, 271, 281 with a combined set of microservices providing a complete application. The microservices 261, 271, 281 can be scaled by upscaling or downscaling a number of microservice replicas 262, 263, 272, 273, 282, 283 as required to process incoming requests to an application. The orchestration system 250 may have an autoscaler system 240 that provides automatic scaling of the microservices 261, 271, 281. This may be an orchestration system integrated autoscaler system or another form of autoscaler system such as an event-driven autoscaler.

The described system includes a microservice activation system 220 for carrying out the described microservice activation method including a detection component 221, a selection component 222, and an activation component 223. The components of the microservice activation system 220 may be provided across various systems in the infrastructure in order to provide the described method functions to activate required microservices for an incoming application request or event 202. For example, the microservice activation system 220 may include components across an ingress controller 210 and an autoscaler system 240 and may use an orchestration system API 230 for interacting with the orchestration system 250.

In another form of implementation, the microservice activation system 220 may be provided by an operator microservice in a container provided in the orchestration system 250 and may detect when an initial microservice scales from zero to one instance, and may scale the other microservices in the application in response.

The various embodiments may alert the system to the incoming traffic and proactively initiate the activation of "scale from zero" for selected microservices of the application. This allows the microservices required for the incoming traffic to begin their cold-start scaling before they actually receive any requests or events from other microservices, thereby reducing or eliminating their cold-start times.

The stages of the method shown in FIG. 1 may be implemented in various different options described below. References to incoming requests may also refer to incoming events in event-based systems.

Detection:

In embodiments, the first stage of the detection 111 of incoming network requests (as shown in FIG. 1) may be provided by a detection component 221. In embodiments, detection component 221 may perform such detection activates using a variety of configurations. One such configuration could include, configuring an existing autoscaler system to scale a single microservice deployment from zero in response to a request. Such a configuration may be modified to detect an incoming request to scale selected microservices of the application. Another configuration could include, configuring an operator (e.g., running independently in an orchestration system) to monitor the replica count of an initial microservice that is scaled up (e.g., via existing technology) in response to an incoming request. In this configuration, when the replica count increases from zero, the selection stage may be activated. Another configuration could include, configuring an ingress controller to be responsible for routing incoming requests to their respective endpoints (microservices). Such a configuration can be configured to know which microservice to route a request to and/or be modified to activate the selection stage. While the aforementioned configurations associated with detection component 221 may be discussed separately, detection component 221 may also be configured to have any combination of configurations contemplated herein.

Selection:

In embodiments, the second stage of the selection 112 of microservices that are required for the fulfillment of the incoming request (as shown in FIG. 1) may be provided by the selection component 222. In embodiments, selection component 222 may be implemented in a variety of configurations. In some embodiments, selection component 222 may be configured/implemented by adding Orchestration labels to microservice deployments in the application relating to selection rules. In these embodiments, a selector can be used to identify the set of microservices that require scaling. In these embodiments, after the detection component observes the scaling up of the initial deployment, it may use the orchestration system API to look up the deployments with the matching label.

In some embodiments, selection component 222 may be configured/implemented by an event-driven autoscaler system (e.g., Kubernetes Event-driven Autoscaling (KEDA)). In these embodiments, an event-driven autoscaler system may be configured so that when a message arrives on a dedicated event source (e.g., a Kafka topic), microservices selected by selection rules may be scaled. In these embodiments, a scaling service may apply the selection rules based on the incoming message and send a wake-up message to the selected microservices that each receives and consumes the wake-up message. While the aforementioned configurations associated with selection component 222 may be discussed separately, selection component 222 may also be configured to have any combination of configurations contemplated herein.

Activation:

The third stage of the activation 113 of microservices that may be required for the fulfillment of the incoming request (as shown in FIG. 1) may be provided by the activation component 223. In some embodiments, the activation component 223 may be implemented in a variety of configurations. In some embodiments, the activation component 223 may be configured to scale up the microservices by using the orchestration system API to increase the replica count of subsequent microservices to one. In some embodiments, the activation component 223 may be configured to send an HTTP request to a known endpoint provided by each of the subsequent microservices. In these embodiments, this can trigger an existing scaling controller (e.g., Knative Serving® activator) to scale up the microservices to one. Often, in such embodiments, such a request does not cause the microservice to perform actual work, but simply triggers the microservice to scale. As a result, a request to a health check endpoint (such as "/health") may be used. In some embodiments, the activation component 223 may be configured to send a wake-up message to a dedicated event source (e.g., an event service topic). While the aforementioned configurations associated with activation component 223 may be discussed separately, activation component 223 may also be configured to have any combination of configurations contemplated herein.

Implementation 1:

In some embodiments, existing autoscaling technology in an orchestration system or a serverless system may be enhanced to allow scaling policies to be applied across a set of microservices. Such an embodiment may reduce the need to have each microservice have its own individual policy.

In some embodiments associated with detection, an existing scaling controller may be configured to already scale a single microservice deployment from zero in response to a request. In these embodiments, such a configuration may be modified to scale selected microservices required for the request.

In some embodiments associated with selection implementations, orchestration labels may be added to microservice deployments in the application relating to selection rules, such that a selector can be used to identify the set of microservices that require scaling. After the detection observes the scaling up of the initial deployment, it may use the orchestration system API to look up the other deployments with the matching label. In other embodiments, an event-based scaling controller may be configured so that when a message arrives on a dedicated event source (e.g., an event topic), selection rules can be applied and the selected microservices may be scaled.

In some embodiments associated with activation implementations, the selected microservices may be scaled up by using the orchestration system API to increase the replica count of subsequent microservices to one.

Implementation 2:

In embodiments, an orchestration microservice known as an "Operator" may be provided to detect when a first microservice scales from zero to one instance and may scale selected other microservices in the application in response.

In some embodiments associated detection, an operator (e.g., an operator running independently in the orchestration system) may monitor the replica count of the initial microservice. For example, a microservice that is scaled up (e.g., using existing technology) in response to an incoming request, and when that replica count increases from zero, the operator may trigger the selection and activation steps as contemplated herein generally, and particularly below.

In some embodiments associated selection, orchestration labels may be added to microservice deployments in the application relating to selection rules, such that a selector can be used to identify the set of microservices that require scaling. In embodiments, after the detection component observes the scaling up of the initial deployment, it may use the orchestration system API to look up the deployments with the matching label.

In some embodiments associated with activation, microservices may be scaled up by using the orchestration system API to increase the replica count of subsequent microservices to one.

Implementation 3:

In embodiments, an existing ingress controller or autoscaler may send a broadcast message to all the microservices in an application to wake them up. Such embodiments may be achieved using a number of known technologies such as an HTTP request to a predefined endpoint (e.g., "/health").

In some embodiments associated with detection, the ingress controller may be responsible for routing incoming requests to their respective endpoints (e.g., microservices). Such embodiments may enable systems to already know which microservice to route a request to, and can be modified to implement the selection and activation steps as described below.

In some embodiments associated with selection, orchestration labels may be added to microservice deployments in the application relating to selection rules, such that a selector can be used to identify the set of microservices that require scaling. In embodiments, after the detection component observes the scaling up of the initial deployment, it may use the orchestration system API to look up the deployments with the matching label.

In some embodiments associated with activation, an HTTP request may be sent to a known endpoint provided by each of the subsequent microservices. This will trigger an existing scaling controller to scale up the microservices to one. In these embodiments, this request must not cause the microservice to do actual work, but simply trigger it to scale. As a result, a request to a health check endpoint (such as "/health") would be suitable.

Implementation 4:

In embodiments, in an event-driven scaling system, an initial microservice may first receive the incoming request and may publish a message to a message broker on a predefined topic. In these embodiments, a subscriber system may subscribe to this topic and scale the other microservices on receipt of the message.

In embodiments associated with detection, a first microservice may receive the message as normal.

In embodiments associated with selection, an event-based scaling controller may be configured so that when a message arrives on a dedicated event source (e.g., event topic), microservices selected by selection rules are scaled. In embodiments, scaling service applies the selection rules based on the incoming message and sends a wake-up message to the selected microservices that each receives and consumes the wake-up message.

In embodiments associated with activation, a wake-up message may be sent to the selected microservices for activation and the message may be consumed by the microservice.

Implementations with Further Details for Selecting a Subset of Microservice of an Application for Activation:

In embodiments the selection stage 112 may be provided by the selection component 222. In these embodiments selection component 222 may select a subset of the microservices of an application and this is described further with two example embodiments. A first embodiment uses an HTTP based scaling using an ingress controller. A second embodiment uses event-based scaling using an autoscaler.

In embodiments, the selection component 222 may provide a proactive scaling service which can analyze the incoming request and apply a set of pre-defined rules to map a request to a set of microservices. In embodiments, the selection component 222 may receive the request and analyzes the request to produce a classification or label. In these embodiments the selection component 222 applies a set of application-specific rules that map the classifications or labels to a set of microservices.

In embodiments, examples of attributes of a request, which may be inspected by the scaling service, include, but are not limited to. request metadata and request payload. In embodiments, request metadata may include: HTTP headers (e.g., Content-Type, Content-Length, custom "x-" headers), HTTP method (e.g., GET, POST), HTTP query parameters, HTTP request path, event topic name. In embodiments, request payload may include the HTTP body data or event message contents.

Figure 3A:
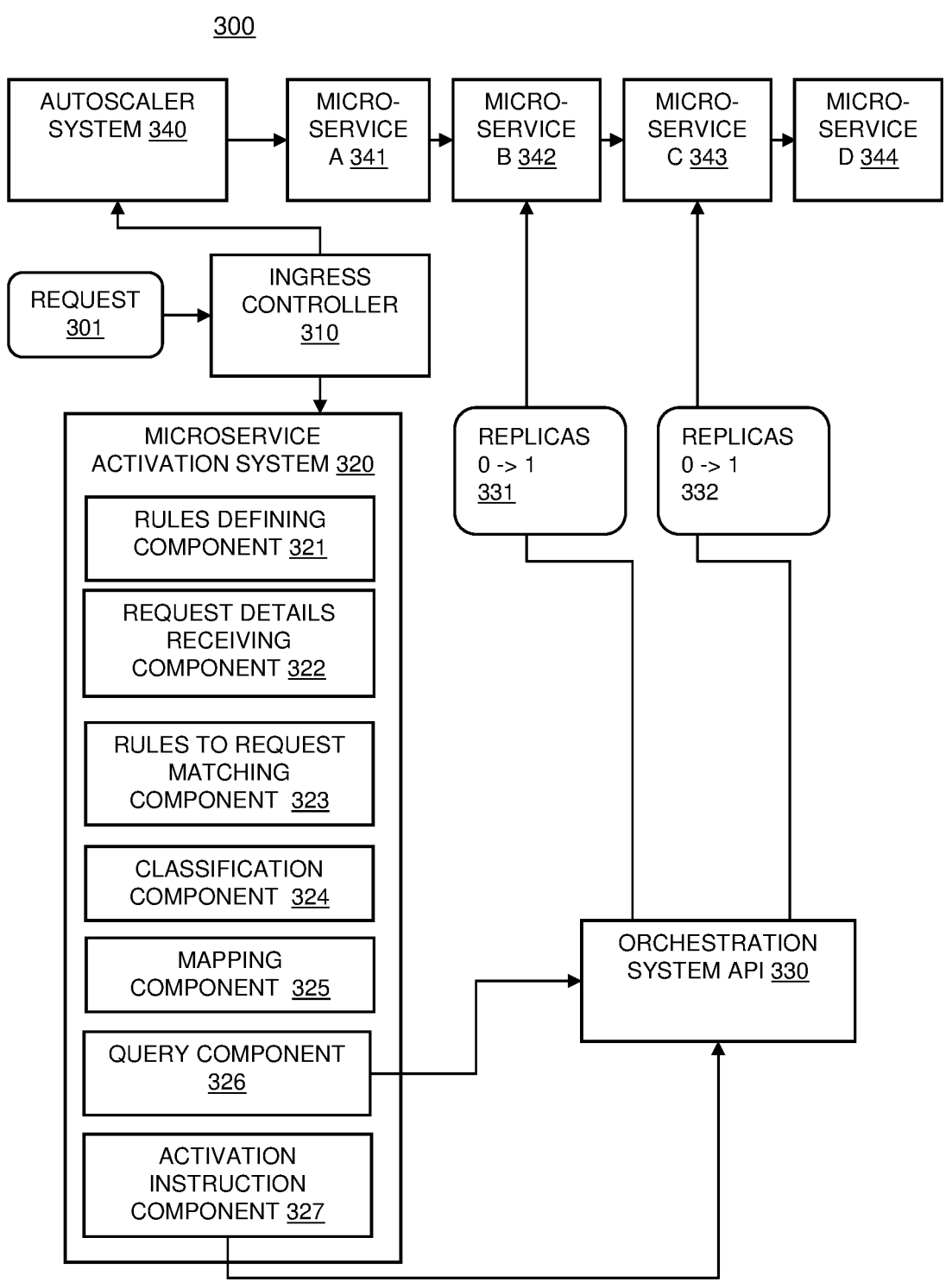
FIG. 3A illustrates a block diagram of an example embodiment of an implementation of a system, in accordance with embodiments of the present disclosure.

Implementation Using HTTP Based Scaling Using an Ingress Controller:

In embodiments, a conventional ingress controller is capable of analyzing attributes of an HTTP request and using this information to determine which microservice should receive that request. Referring to FIG. 3A, an implementation 300 is shown that leverages analysis of an HTTP request (for example, the method, path, query parameters, and headers) to select and scale a number of microservices.

In embodiments, when a request 301 arrives at an ingress controller 310, the request may be analyzed to determine which microservice 341 the request 301 should be delivered to and to route the request 301 to an existing autoscaler system 340 for microservice A 341 as part of its normal function. In embodiments, the ingress controller 310 routes may provide details of the request to a microservice activation system 320 that may provide a proactive activation service.

In embodiments, the microservice activation system 320 may be implemented in a variety of configurations. In some embodiments one configuration may include the microservice activation system 320 as an embedded component, such as an ingress controller plugin, that performs the proactive activation service in addition to the normal function of the ingress controller 310 of routing requests to the intended endpoint. In some embodiments another configuration may include the microservice activation system 320 as a separate component called by the ingress controller 310 in addition to its normal routing function. In some embodiments another configuration may include the microservice activation system 320 as a separate component that acts as a forwarding proxy. In this embodiment, the ingress controller 310 may route all traffic to the microservice activation system 320, and the microservice activation system 320 may both forward the request to the intended endpoint as well as perform the proactive activation service.

In embodiments, the microservice activation system 320 may include components for carrying out the method 350 as shown in the flow diagram of FIG. 3B. The microservice activation system 320 may include rules defining component 321 for configuring 351 application-specific rules for types of requests to an application using request attributes and payloads. Such embodiments may be user-defined rules that may be adapted and reconfigured as required for the application.

In embodiments, the microservice activation system 320 may include components for handling the selection of microservices for an incoming request including, but not limited to: a request details receiving component 322, a request to rules matching component 323, a classification component 324, a mapping component 325, a query component 326, and an activation instruction component 327.

Referring to FIG. 3B, illustrates a flowchart of method 350 depicting operations associated with microservice activation system 320, in accordance with embodiments of the disclosure. In embodiments, the microservice activation system 320 receives 352 details for the incoming request to the application and applies 353 the defined rules to the request attributes and payloads to determine 354 a classification for the request.

In embodiments, the classification may be mapped 355 to a selection of microservices such as by using an orchestration label (such as a text-based label) applied for the classification or by looking up a list of deployments.

In embodiments, the method may scale each selected microservice if it is currently scaled to zero. The microservice activation system 320 may query 356 the orchestrator system API 330 to obtain the desired replica counts for the deployments. For example, by matching the label, the microservice activation system 320 may use 357 the orchestration system API 330 to set the replica count for the selected microservices.

In some embodiments, (e.g., examples discussed in reference to FIG. 3A), the request 301 may be an HTTP POST to "/orders" representing a user creating a new order. In these embodiments, the initial microservice A 341 may scale from zero using an existing scaling service.

The following is an example configuration for a set of rules that may be configured to match on HTTP request attributes and map them to a set of orchestration deployments or a single orchestration label:

```
rules:
    match: method==POST && path==/orders
        classification=create_order
    match: method==POST && path==/customers
        classification=create_customer
mappings:
    classification: create_order
        deployments: order_service, customer_service, pay-
            ment_service
    classification: create_customer
        label: create_customer_participant
```

In an example embodiments, the deployments may be determined to be microservice A 341 (order_service), microservice B 342 (customer_service), and/or microservice C 343 (payment_service). In these embodiments, Microservice D 344 is not involved in this request. The microservice activation system 320 may set the desired replica count to one for any deployment whose count was currently zero. Such embodiments can allow one method to directly modifying the replica count of each deployment via the orchestration system API 330.

Continuing this example embodiment, microservice B 342 and microservice C 343 can be scaled to one 331, 332. Microservice A 341 may already be scaled to one via the existing autoscaler system 340 handling the initial microservice for the request 301.*n* Microservice A 341 may process the request and make a request to microservice B 342, which is already scaled up and can handle the request immediately. Microservice B 342 processes the request and makes a request to microservice C 343, which is already scaled up. Implementation Using Event-Based Scaling Using an Autoscaler:

In embodiments using an event-driven autoscaler, it may be possible to scale a service when an event arrives on the event queue. This mechanism is leveraged to intelligently scale the required microservices within the application.

An example configuration is provided below for matching an event to a set of services that are involved assuming a structured format or schema for the event that can be used by scaling service to parse the message.

```
rules:
    match: queue==orders && event_type=CREATE
        classification: create_order
    match: queue==customers && event_type=CREATE
        classification: create_customer
mappings:
    classification: create_order
        deployments: order_service, customer_service, pay-
            ment_service
    classification: create_customer
        label: create_customer_participant
```

Figure 4:
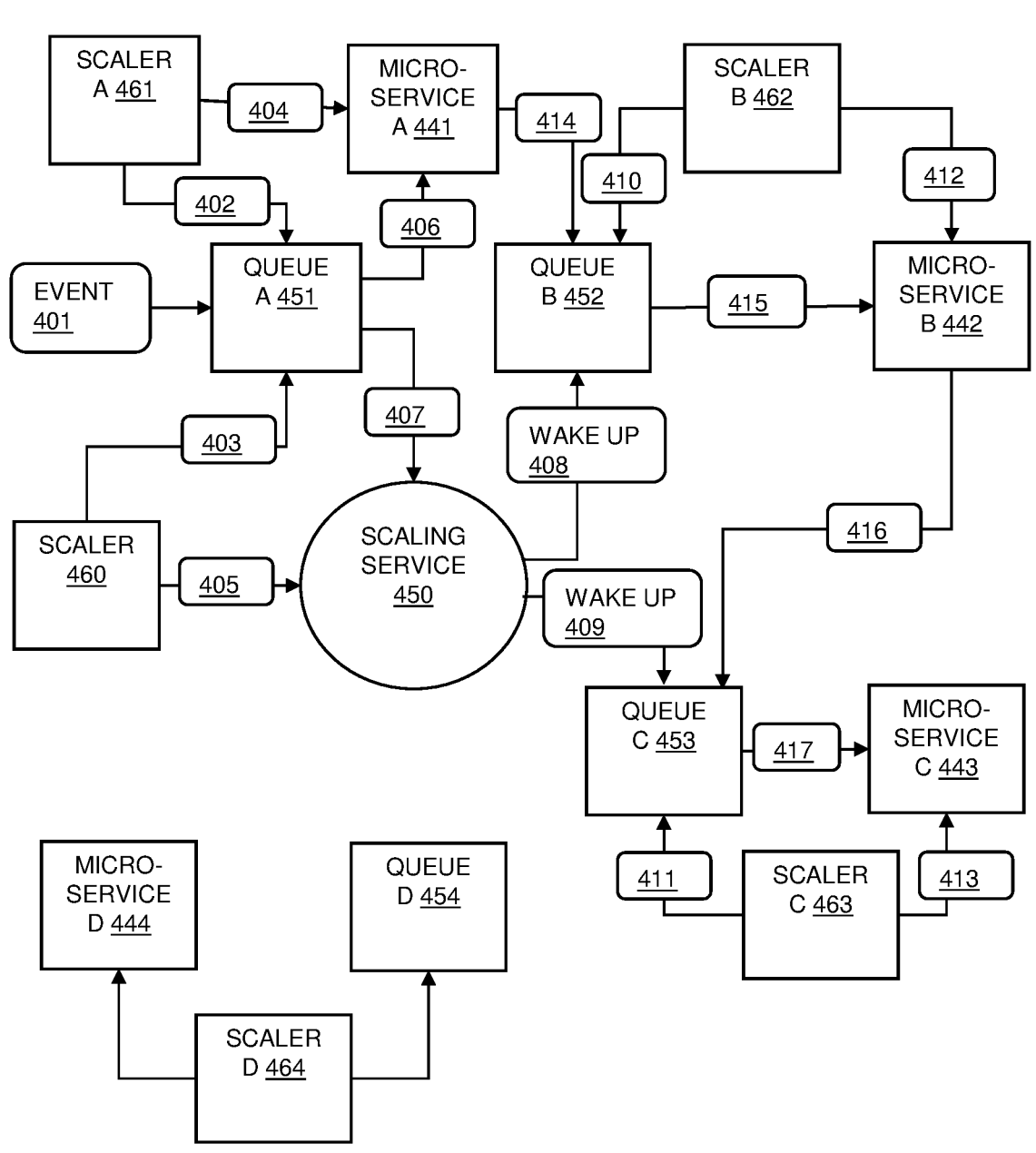
FIG. 4 depicts a schematic diagram, in accordance with embodiments of the present disclosure.

Referring to FIG. 4, an example schematic 400 is illustrated, in accordance with embodiments of the disclosure. In embodiments, schematic 400 includes four microservices 441, 442, 443, 444 in an application, scaling service 450. Scaling service 450 may be configured to handle the scaling of the required microservices depending on a received event 401. In some embodiments, scaling service 450 may apply predefined application-specific rules to an incoming event to classify the event and map the classification to microservices to be activated.

In embodiments, event 401 may arrive to queue A 451. Scaler A 461 may be watching 402 queue A 451 and can be configured to detect the activity. In embodiments, when activity is detected scaler A 461 may initiate 404 the scaling process for microservice A 441. In embodiments, a scaler 460 for the scaling service 450 may also watch queues and may detect 403 activity on queue A 451. In these embodiments, responsive to detecting 403 activity on queue A 451, scaler 460 may initiate scaling service 450 and scaled up 405, or initiate scaling processes for the associated microservices.

Once microservice A 441 and the scaling service 450 are up, the event from queue A 451 can be sent 406, 407 to be processed.

In embodiments, the scaling service 450 may determine what microservices that are needed for the event 401 that should be scaled up. If scaling service 450 determines that a microservice is needed, scaling service 450 can send a "wake up" event 408 to queue B 452 for microservice B 442 and a "wake up" event 409 to queue C 453 for microservice C 443. In these exemplary embodiments, microservice D 444, that has a scaler D 464 and queue D 454, may be determined to not be part of the event process for this incoming event 401. In some embodiments, multiple scaling services 450 may be available to handle the scaling more efficiently in bigger applications.

In embodiments, scaler B 462 and scaler C 463 may detect 410, 411 and the wake-up event on their respective queues 452, 453. In embodiments, responsive to detecting 410, 411, scaler B 462 and scaler C 463 may initiate 412, 413 the scaling processes of microservice B 442 and microservice C 443 respectively.

At this point in exemplary embodiments referenced in FIG. 4, or earlier, microservice A 441 may have finished processing the initial event. In these embodiments, microservice A 441 may continue the process by sending 414 an event to queue B 452 while microservice B 442 and microservice C 443 are being scaled up.

In this example embodiment, since microservice B 442 has already been requested to scale up, microservice B 442 should not take as long to be available. Once microservice B 442 is up/available the event from queue B 452 will be sent 415 to microservice B 442 for processing. Microservice B 442 may then process the event and send an event 416 to queue C 453. Microservice B 442 may also consume the "wake up" event 408 sent by the scaling service 450 to remove it from the queue B 452. This embodiment may also prevent microservice B 442 from being scaled down in the meantime if something else consumes the event.

Microservice C 443 may be already up. If microservice C 443 is up, microservice C 443 may receive 417, the event from queue C 453, and processes it. Microservice C 443 may also consume the "wake up" event 409. "Wake up" event 409 may be sent by the scaling service 450 to remove it from the queue C 453.

Figure 5:
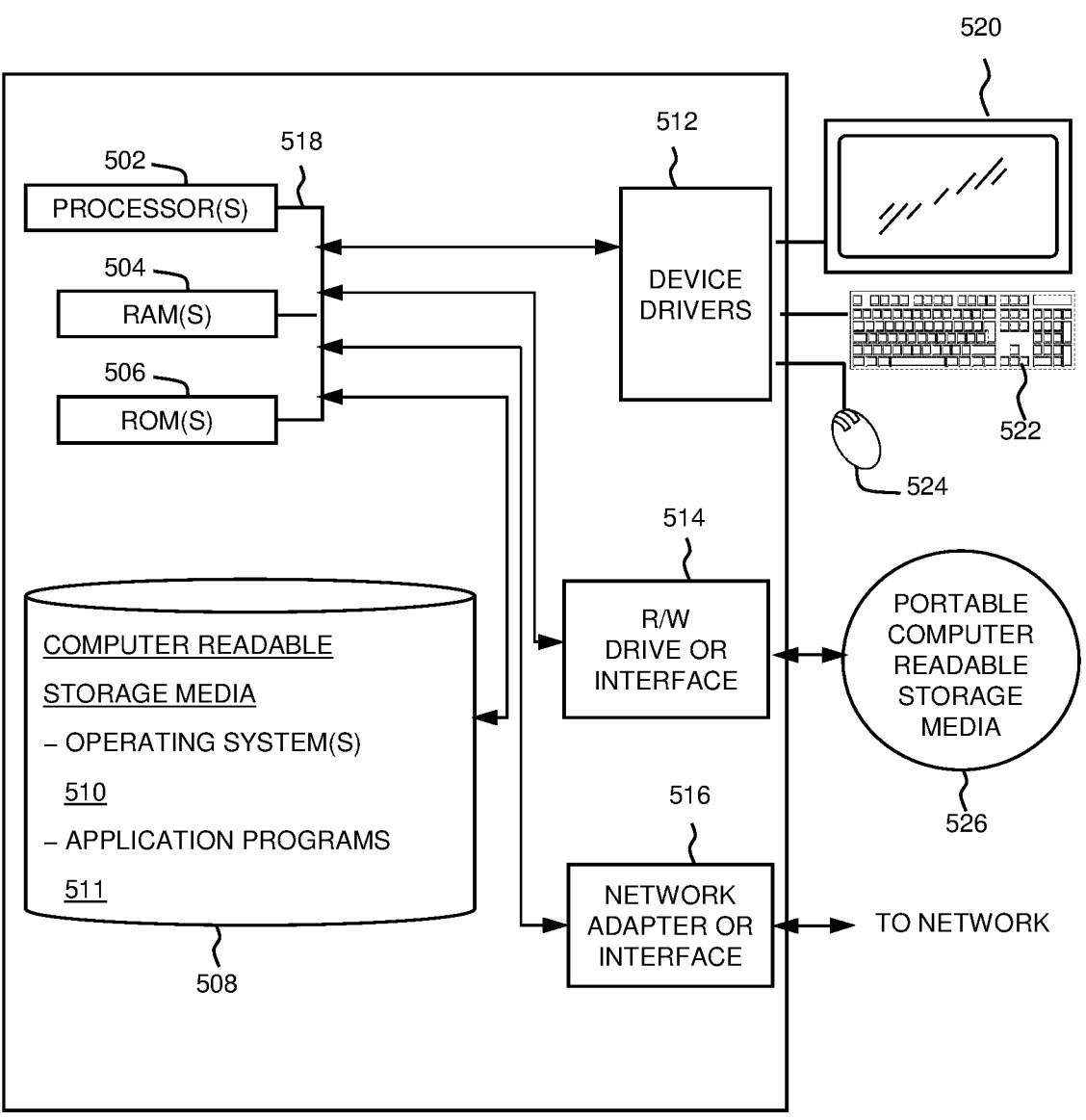
FIG. 5 illustrates a cloud computing environment, in accordance with embodiments of the present disclosure.

FIG. 5 depicts a block diagram of components of a computing system as used for the computing system, in accordance with an embodiment of the present disclosure. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the microservice activation system 230 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

The computing system can also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing:

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
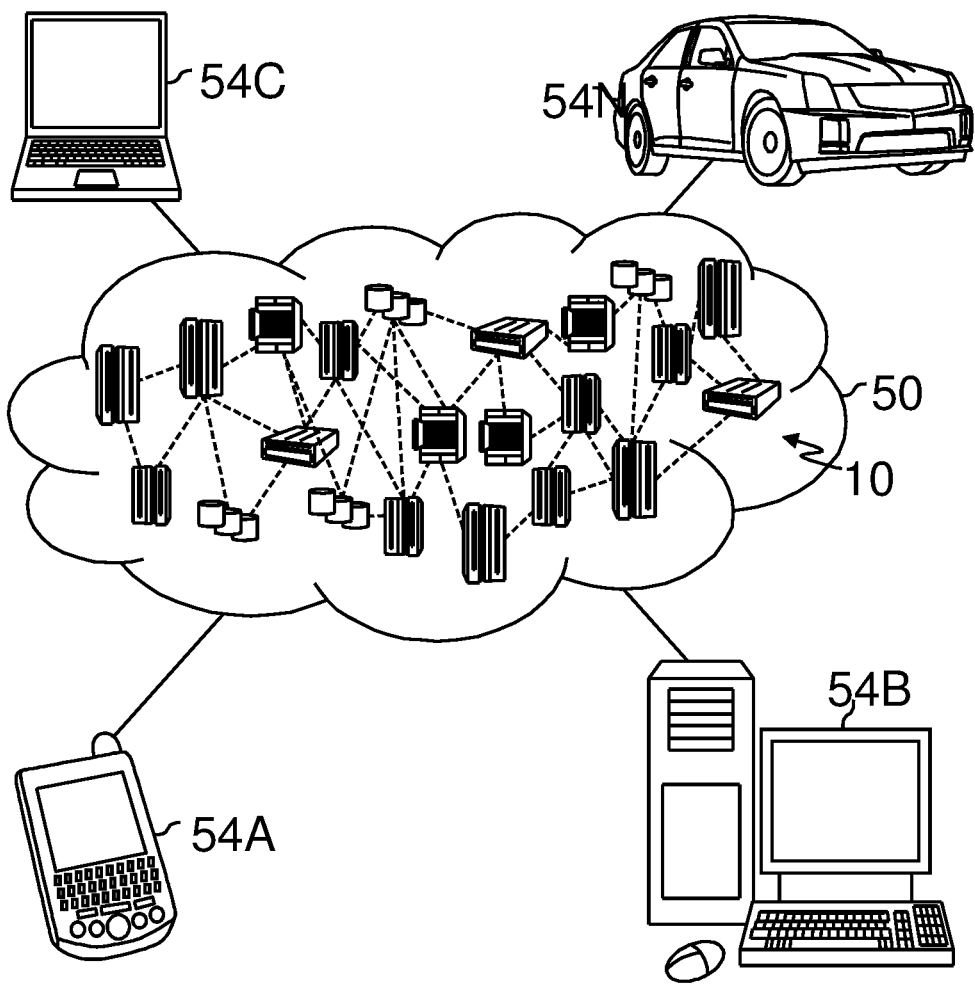
FIG. 6 illustrates abstraction model layers, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
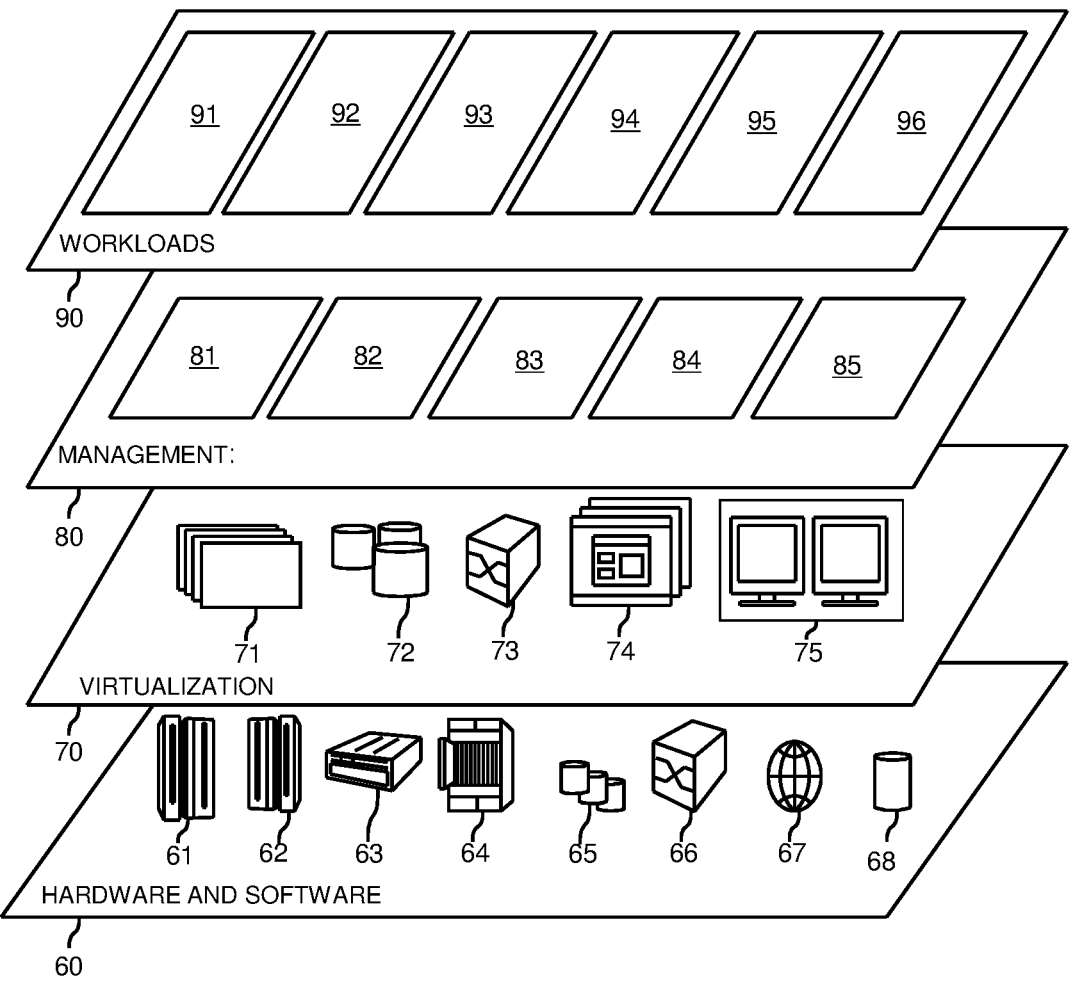
FIG. 7 illustrates a high-level block diagram of an example computer system that may be used in implementing one or more of the methods, tools, and modules, and any related functions, described herein, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice activation processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for reducing start latency of serverless microservices, comprising:

detecting an incoming request or event to an application in a serverless microservice environment based on identifying a particular event topic associated with the incoming request or event from one or more potential event topics, wherein identifying the particular event topic initiates invocations of one or more microservices of the application;

monitoring a replica count of an initial microservice, wherein the initial microservice controls the incoming request or event;

selecting an amount of selected microservices from the one or more microservices of the application by detecting a change in the replica count from zero, wherein the amount of selected microservices perform a task of the incoming request or event, and wherein the task applies one or more predefined application-specific rules to one or more elements of the incoming request or event to determine the amount of selected microservices;

triggering scaling up activation of the selected microservices of the application by sending a request to a defined endpoint of each of the selected microservices that activates scaling without causing the selected microservices to perform work; and simultaneously invoking the selected microservices of the application to match the amount of selected microservices, thereby reducing a latency associated with a cold start to a startup time of a slowest microservice of the selected microservices rather than a cumulative startup time.

2. The method of claim 1, wherein selecting the amount of selected microservices of the application further includes:

extracting the one or more elements from a payload or one or more attributes of the incoming request or event, wherein the one or more elements extracted from the payload or the one or more attributes are extracted elements; and applying the one or more predefined application-specific rules to the extracted elements.

3. The method of claim 2, wherein extracting the one or more elements further includes:

parsing a message of an incoming event according to a structured format for the event.

4. The method of claim 1, wherein selecting the amount of selected microservices of the application further includes: classifying the incoming request or event, wherein classifying the incoming request or event includes:

applying the predefined application-specific rules to the one or more elements of the incoming request or event; and mapping a classification to a subset of the one or more microservices of the application by querying an orchestration system API to identify one or more microservice deployments having an orchestration label that matches the classification.

5. The method of claim 4, further including:

applying a label to a microservice deployment, the label associated with the pre-defined application-specific rules, wherein a selector uses the label to identify the one or more microservices of the application for activating; and mapping the label to the subset of the one or more microservices of the application, wherein the label is applied to a list of deployments of the subset the one or more microservices of the application.

6. The method of claim 5, further including:

querying a microservice orchestrator application programming interface to obtain one or more replica counts for the amount of selected microservices.

7. The method of claim 4, further comprising:

identifying one or more components of the application; and predicting, based on the incoming request or event, at least one component of the one or more components of the application required to process the incoming request or event; and proactively scaling only the at least one component of the application.

8. The method of claim 1, wherein detecting an incoming event further includes:

triggering a scaling service to select the amount of selected microservices by observing a same incoming event queue as an initial microservice.

9. The method of claim 8, wherein the scaling service further includes:

sending a wake-up event to the incoming event queues to scale up the amount of selected microservices, wherein the wake-up event is consumed by the microservice to remove the wake-up event from the incoming event queues.

10. The method of claim 1, further including:

sending a request to a defined endpoint, provided by the one or more selected microservices, to activate the scaling up activation without causing the amount of selected microservices to perform work.

11. The method of claim 1, wherein the monitoring of the replica count of the initial microservice is performed by a dedicated operator microservice running within the serverless microservice environment.

12. A system for reducing start latency of serverless microservices, the system comprising:

a memory; and a processor in communication with the memory, the processor being configured to perform operations comprising:

detecting an incoming request or event to an application in a serverless microservice environment, wherein the incoming request or event initiates simultaneous invocations of one or more microservices of the application;

monitoring a replica count of an initial microservice, wherein the initial microservice controls the incoming request or event;

selecting an amount of selected microservices from the one or more microservices of the application by detecting a change in the replica count from zero, wherein the amount of selected microservices perform a task of the incoming request or event, and wherein the task applies one or more predefined application-specific rules to one or more elements of the incoming request or event to determine the amount of selected microservices;

triggering scaling up activation of the selected microservices in response to determining that the selected microservices are needed for the incoming request, wherein said triggering reduces a cold-start time of the application; and invoking the selected microservices of the application to match the amount of selected microservices.

13. The system of claim 12, wherein selecting the amount of selected microservices of the application further includes:

classifying the incoming request or event by applying predefined a set of application-specific rules to elements of the incoming request or event; and mapping a classification to a subset of the one or more microservices of the application microservices of the application.

14. The system of claim 13, the operations further comprise:

querying a microservice orchestrator application programming interface to obtain one or more replica counts for the amount of selected microservices.

15. The system of claim 12, wherein detecting an incoming event further includes:

observing incoming event queues using a scaling service, wherein the scaling service selects the amount of selected microservices.

16. The system of claim 15, wherein the scaling service further includes:

sending a wake-up event to the incoming event queues to scale up the amount of selected microservices, wherein the wake-up event is consumed by the microservice to remove the wake-up event from the incoming event queues.

17. The system of claim 12, wherein the operations further comprise:

performing the selecting of the amount of selected microservices using an activation system implemented as an embedded plugin within an ingress controller.

18. The system of claim 12, wherein the operations further comprise:

sending a request to a defined endpoint, provided by the one or more selected microservices, to activate the scaling up activation without causing the amount of selected microservices to perform work.

19. The system of claim 12, wherein the operations further comprise:

forwarding and calling one or more proxy components.

20. A computer program product for reducing start latency of serverless microservices, the computer program product comprising a computer readable storage medium having program instructions embodied therewith, the program instructions executable by a processor to cause the processors to perform a function, the function comprising:

detecting an incoming HTTP request to an application in a serverless microservice environment, wherein the incoming HTTP request initiates simultaneous invocations of one or more microservices of the application;

monitoring a replica count of an initial microservice, wherein the initial microservice controls the incoming HTTP request;

selecting an amount of selected microservices from the one or more microservices of the application by detecting a change in the replica count from zero, wherein the amount of selected microservices perform a task of the incoming HTTP request, and wherein the task applies one or more predefined application-specific rules to one or more elements of the incoming HTTP request to determine the amount of selected microservices, and wherein the one or more elements of the incoming HTTP request comprise at least one of an HTTP query parameter or a custom HTTP header;

triggering scaling up activation of the one or more microservices of the application; and invoking the one or more microservices of the application to match the amount of selected microservices.

* * * * *